United States Patent
Konanur et al.

(10) Patent No.: US 9,252,482 B2
(45) Date of Patent: Feb. 2, 2016

(54) MAGNETIC FIELD PASS THROUGH SURFACES IN CARBON FIBER REINFORCED POLYMERS

(71) Applicant: Intel Corporation, Santa Clara, CA (US)

(72) Inventors: Anand S. Konanur, Sunnyvale, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 13/724,582

(22) Filed: Dec. 21, 2012

(65) Prior Publication Data

US 2014/0111387 A1 Apr. 24, 2014

Related U.S. Application Data

(60) Provisional application No. 61/717,719, filed on Oct. 24, 2012.

(51) Int. Cl.
*H01Q 1/24* (2006.01)
*H01P 11/00* (2006.01)
*H01Q 7/00* (2006.01)

(52) U.S. Cl.
CPC ............... *H01Q 1/243* (2013.01); *H01P 11/00* (2013.01); *H01Q 7/00* (2013.01); *Y10T 29/49016* (2015.01)

(58) Field of Classification Search
CPC ................................ H01Q 1/243; H01Q 7/00
USPC .................................................. 343/702, 872
See application file for complete search history.

(56) References Cited

U.S. PATENT DOCUMENTS

| | | | | |
|---|---|---|---|---|
| 4,092,453 | A | 5/1978 | Jonda | |
| 5,440,320 | A | 8/1995 | Lach et al. | |
| 7,298,335 | B2 * | 11/2007 | Usui | G06F 1/1616 343/700 MS |
| 8,372,495 | B2 * | 2/2013 | Kenney | G06F 1/1656 428/34.1 |
| 8,511,498 | B2 * | 8/2013 | Kenney | G06F 1/1613 220/62.22 |
| 8,857,128 | B2 * | 10/2014 | Kenney | B29C 43/006 52/202 |
| 8,913,373 | B2 * | 12/2014 | Kawamoto | G06F 1/1616 174/260 |
| 2012/0222985 | A1 * | 9/2012 | Kenney et al. | 206/524.6 |
| 2012/0252480 | A1 | 10/2012 | Krutt et al. | |
| 2013/0190052 | A1 * | 7/2013 | Lundell | 455/566 |
| 2014/0002313 | A1 * | 1/2014 | Yang et al. | 343/702 |

FOREIGN PATENT DOCUMENTS

| | | |
|---|---|---|
| JP | 11168321 A | 6/1999 |
| JP | 2000-244235 A | 9/2000 |
| WO | 2014/065896 A1 | 5/2014 |

OTHER PUBLICATIONS

International Search Report and Written Opinion received for PCT Application No. PCT/US2013/048040, mailed on Sep. 26, 2013, 13 pages.
International Preliminary Report on Patentability and Written Opinion Received for PCT Patent Application No. PCT/US2013/048040, mailed on May 7, 2015, 10 pages.

* cited by examiner

*Primary Examiner* — Hoang V Nguyen
(74) *Attorney, Agent, or Firm* — Forefront IP Lawgroup, PLLC

(57) ABSTRACT

This document discloses one or more systems, apparatuses, methods, etc. for integrating coil antennas in a carbon fiber chassis portable device. More particularly, the carbon fiber chassis portable device containing unidirectional weave carbon fibers in its chassis—to support near field communications (NFC) related functions—is described.

20 Claims, 8 Drawing Sheets

MAGNETIC FIELD PASS THROUGH SURFACES IN CARBON FIBER REINFORCED POLYMERS

RELATED APPLICATION

This application claims the benefit of priority of U.S. Provisional Patent Application Ser. No. 61/717,719 filed Oct. 24, 2012.

BACKGROUND

Near field communication (NFC) is an emerging radio frequency identifier (RFID) based technology that promises to enable wireless transfer of data over very short distances and replace regular contact based interactions with a contactless interaction between two devices or a device and a card placed in close proximity. Typical usages include coupons, identifier (ID) cards, mobile payments and peer to peer connections between devices.

Another emerging technology is wireless charging. A magnetic field may be induced in a device to charge a power source (i.e., battery) of the device. Such technologies avoid the use of charging cables and other such accessories.

As mobile computing devices such as Ultrabooks, notebooks, tablets and hand held devices get thinner and lighter, the consumer electronics and computing industry is adopting different composites as a chassis material. A key composite that is gaining such use is carbon fiber reinforced polymer or CFRP. These lightweight chassis materials are extremely strong and are suited for molding into various chassis shapes.

Typically, in order to integrate NFC or wireless charging into a chassis with carbon fiber, a cutout is necessary to expose the coil. This hinders both the aesthetic appeal of and can compromise the overall structural integrity of the chassis.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

This document discloses one or more systems, apparatuses, methods, etc. for integrating coil antennas in a carbon fiber chassis portable device and more particularly, to improve near field coupling capabilities of portable devices. Near field coupling includes, by way of illustration and not limitation, wireless power transfer (WPT) and/or near field communications (NFC) capabilities of the portable devices.

In an implementation, weaving of the carbon fiber in the carbon fiber chassis portable device is exploited to reduce or minimize formation of Eddy current loops. For example, bundles of carbon fiber strands are configured to form a unidirectional weave. In this example, a direction of the carbon fiber strands with the unidirectional weave may adapt to the direction of a continuous loop of coil antenna used for NFC related functions. The coil antenna may be integrated underneath the unidirectional weave carbon fiber chassis, or independently positioned below the unidirectional weave carbon fiber chassis. In this configuration, the unidirectional weave carbon fiber configuration provides high impedance to a resulting Eddy current that may be generated by magnetic fields of the coil antenna. For example, during transmit mode of the coil antenna, a current injected to the coil antenna may generate the magnetic fields that may further create the Eddy current loops to the unidirectional weave carbon fiber chassis. In this example, the high impedance due to the configuration of the unidirectional weave carbon fiber chassis eliminates the Eddy current that may be generated.

Figure 1:
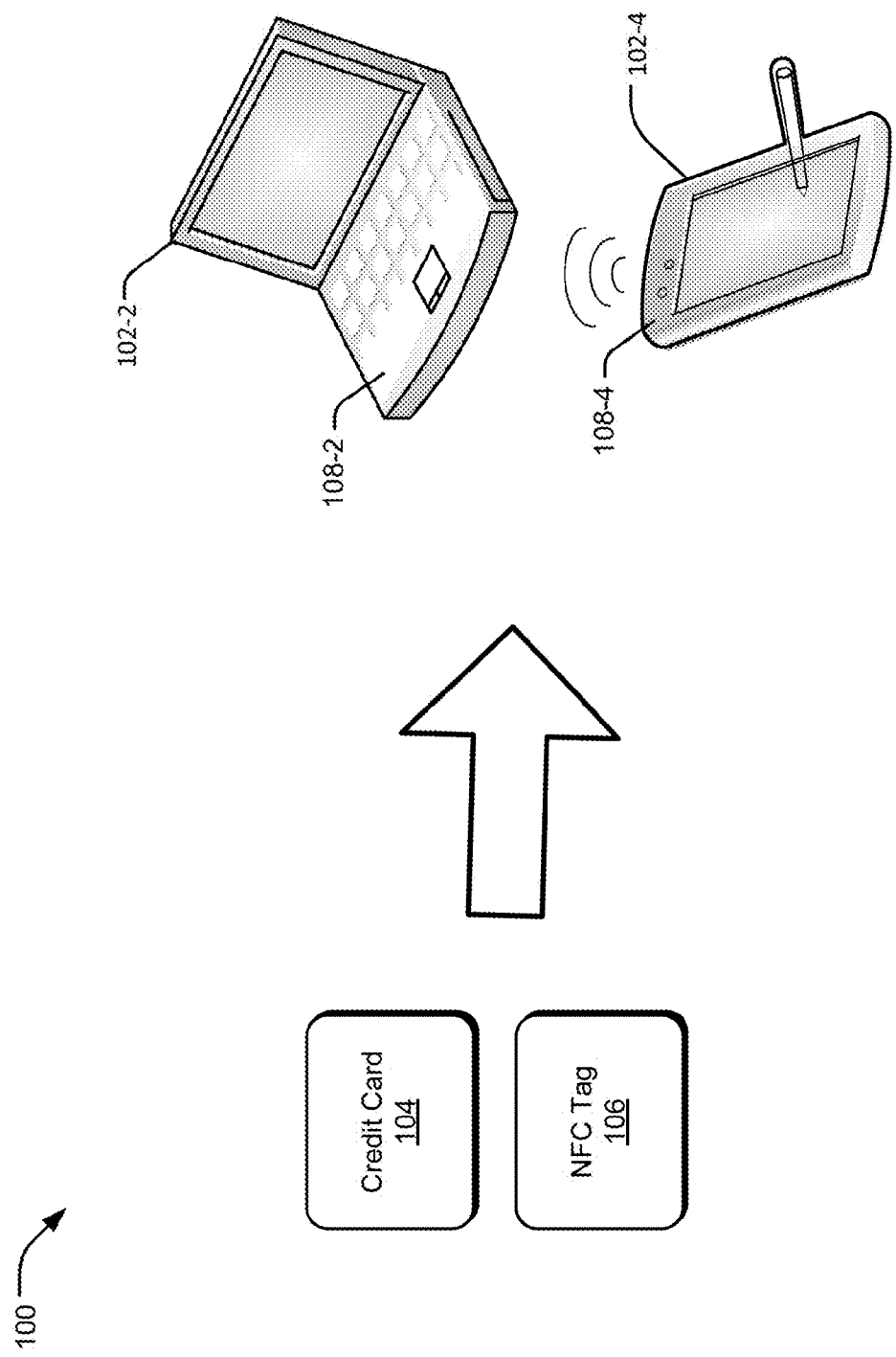
FIG. 1 is an example arrangement of portable devices when performing near field coupling.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include, but are not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

As an example of present implementation herein, two users (not shown) operate their NFC-enabled portable devices 102-2 and 102-4 to perform NFC-related information sharing functions. In this example, the portable devices 102-2 and 102-4 perform the NFC communication in a front-to-back configuration. In another example, the portable devices 102 accept information from a credit card 104 or from an NFC tag 106 through a NFC antenna (not shown). In this example, the NFC antenna is integrated in a carbon fiber chassis 108 of the portable device 102.

As an example of present implementation herein, the carbon fiber chassis 108 is a carbon-fiber-reinforced-polymer (CFRP) that has a high strength-to-weight ratio and good rigidity, especially in thin portable devices 102 such as Ultrabooks. In this example, the NFC antenna may be integrated in a mold of the carbon fiber chassis 108, or in other implementations, the carbon fiber chassis itself is utilized as the NFC antenna. Typically, the molding of the carbon fiber chassis 108 involves layering sheets of carbon fiber cloth (i.e., weaved bundles of carbon fiber strands) into the mold that is configured to be a shape of a final product (i.e., chassis of the portable device 102). For example, a top layer (not shown) of carbon fiber with a particular alignment and weave is chosen to optimize strength and stiffness properties of the carbon fiber chassis 108. In this example, an epoxy (not shown) is impregnated into the carbon fibers or the epoxy is painted underneath the top layer of carbon fiber in order to attach a bottom layer (not shown) of another carbon fiber. The bottom layer of carbon fiber is a second layer of carbon fiber to provide additional strength to finished product.

Figure 2:
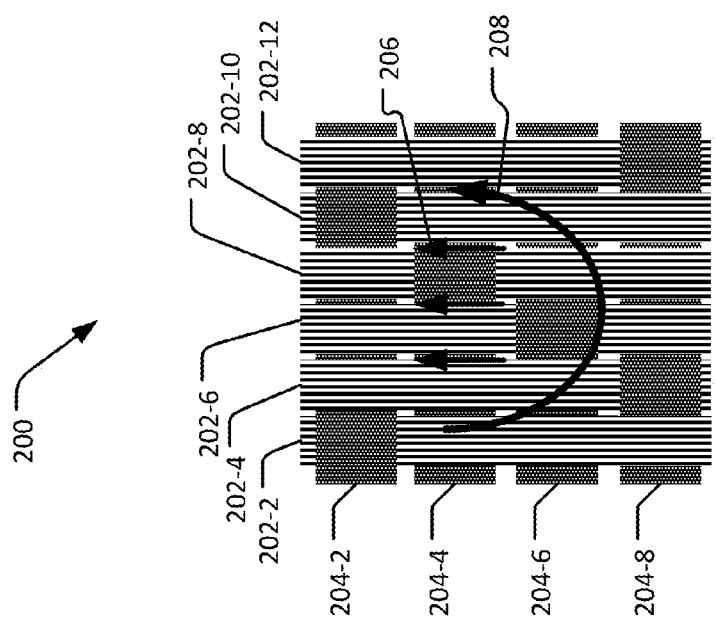
FIG. 2 is an example carbon fiber reinforced polymer (CFRP) that contains a twill weave carbon fiber configuration.

FIG. 2 illustrates an example CFRP 200 that contains a twill weave carbon fiber configuration. For example, the CFRP 200 contains vertical carbon fibers 202 and horizontal carbon fibers 204 that are interlaced together in a three-by-one twill weave configuration. Furthermore, FIG. 2 illustrates an example injected current 206 in the coil antenna (not shown) and a corresponding Eddy current 208 that is generated by the CFRP 200.

As an example of present implementation herein, a vertical carbon fiber 200-2 contains multiple strands of CFRP that are bundled together to form the vertical carbon fiber 200-2. This configuration may similarly apply to the rest of vertical carbon fibers 200-4, 200-6, . . . and 200-12. The horizontal carbon fibers 202 are similarly constructed in the same configuration. For example, a horizontal carbon fiber 202-2 may contain multiple strands of CFRP that are bundled together to form the horizontal carbon fiber 202-2. This configuration of the horizontal carbon fiber 202-2 may similarly apply to the rest of horizontal carbon fiber 202-4, 202-6, and 202-8.

As an example of current implementation herein, the vertical carbon fibers 200 and the horizontal carbon fibers 202 are interweaved with one another to form a single layer (i.e., CFRP 200) in the carbon fiber chassis 108. Multiple layers of CFRP 200 may reinforce one another to provide a thin and strong carbon fiber chassis 108. In an implementation, the twill weave shows the horizontal carbon fiber 202-2 that is on top of the vertical carbon fiber 200-2. Thereafter, the horizontal carbon fiber 202-2 is weaved to the bottom of the next three vertical carbon fibers 200-4, 200-6, and 200-8 before it goes back again to the top of the vertical carbon fiber 200-10. In other words, the three-to-one twill weave configures the horizontal carbon fiber 202-2 to be at one side for three adjacent vertical carbon fibers 200, and then it goes back to other side of the next single adjacent vertical carbon fiber 200. This configuration repeats itself in both horizontal and vertical directions.

In another example, such as in a one-to-one twill weave, the horizontal carbon fiber 202-2 stays on top of a single vertical carbon fiber 200 and then it goes to the bottom of the next adjacent vertical carbon fiber 200. This configuration repeats after every single vertical carbon fiber 202 when illustrated from left to right direction, or it repeats after every single horizontal carbon fiber 204 when illustrated from top to bottom direction in the CFRP 200.

With continuing reference to FIG. 2, the three-to-one twill weave is applied from left to right direction (as shown above), and also from top to bottom direction. For example, the top to bottom direction shows the horizontal carbon fibers 202-4, 202-6, and 202-8 to be located underneath the vertical carbon fiber 200-2. In this example, the next horizontal carbon fiber 202 (not shown) will stay on top of the vertical carbon fiber 200-2. In another implementation, the direction of the carbon fibers in FIG. 2 contains certain angle rather than being perpendicular with one another such as in the current CFRP 200 configuration. For example, a diagonal carbon fiber is interlaced with the vertical carbon fiber 200 to form a letter "X" arrangement. In this example, the three-to-one twill weave configuration may similarly apply.

As an example of current implementation herein, the coil antenna that may be positioned underneath the CFRP 200 may be supplied with the injected current 206 such as, during transmit mode of the coil antenna. In this example, magnetic fields (not shown) are generated by the coil antenna as a consequence. In an implementation, the CFRP 200 generates the Eddy current 208 due to minimal impedance that is created by the twill weave configuration. In this implementation, the Eddy current 208 may provide its own magnetic fields (not shown) that may cancel the magnetic fields due to the injected current 206. As a result, minimal magnetic fields during the transmit mode of the coil antenna will penetrate the CFRP 200. For example, a voltage measurement across a reference coil placed at the other side of the CFRP 200 will have minimum readings due to the minimal impedance generated by the twill weave configuration on the resulting Eddy current 208.

Figure 3:
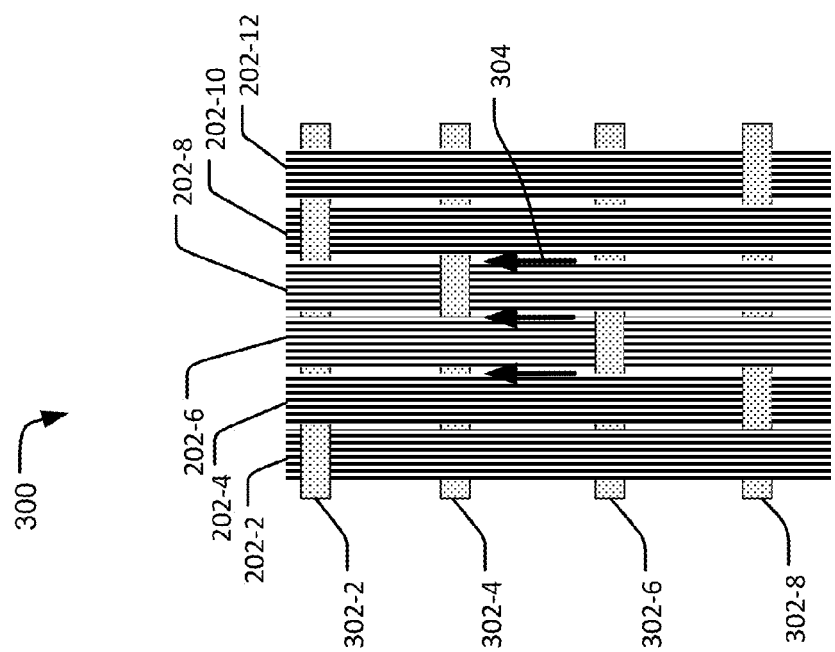
FIG. 3 is an example carbon fiber reinforced polymer (CFRP) that contains a unidirectional weave carbon fiber configuration.

FIG. 3 illustrates an example CFRP 300 that contains a unidirectional weave carbon fiber configuration. For example, the CFRP 300 contains the vertical carbon fibers 202 and horizontal non-conductive lacings 302. Furthermore, FIG. 2 illustrates an example induced current 304 into the coil antenna (not shown) that is positioned or integrated underneath the CFRP 300.

As an example of present implementation herein, the horizontal non-conductive lacings 302 are interweaved with the vertical carbon fibers 202 in order to provide strength of materials to the CFRP 300. In this example, the non-conductive lacing 204 contains composite materials that do not allow electricity to pass through. For example, the non-conductive lacing 204 may be a plastic or a paper insulator positioned in three-by-one twill weave configuration with the vertical carbon fibers 202. In other words, the CFRP 300 is basically a set of carbon fibers where all the strands or bundles of strands are parallel with one another or weaved to the same direction.

As an example of present implementation herein, the magnetic fields may pass through the CFRP 300 in order to create the induced current 304 in the coil antenna. In this example, the induced current 304 is supposed to generate Eddy current (not shown) in the CFRP 300; however, the unidirectional weave configuration of the CFRP 300 provides high impedance to the supposed Eddy current. The high impedance may result when the supposed Eddy current crosses in between vertical carbon fibers 202. In other words, the CFRP 300 configuration cancels the presence of the Eddy current because out-of-phase magnetic fields are not generated from the coil antenna. Consequently, the CFRP 300 configuration may be positioned to a plane area (not shown) that covers at least the plane area that is defined by an exposed outermost loop (not shown) of the coil antenna.

As an example of present implementation herein, an actual fraction of the magnetic fields that may traverse the CFRP 300 from the outside is dependent on the "tightness" of the unidirectional weaving pattern. Furthermore, other parameters such as losses due to epoxy, core, and the like, may limit the actual fraction of the magnetic fields that may provide the induced current 304 to the coil antenna.

Figure 4A:
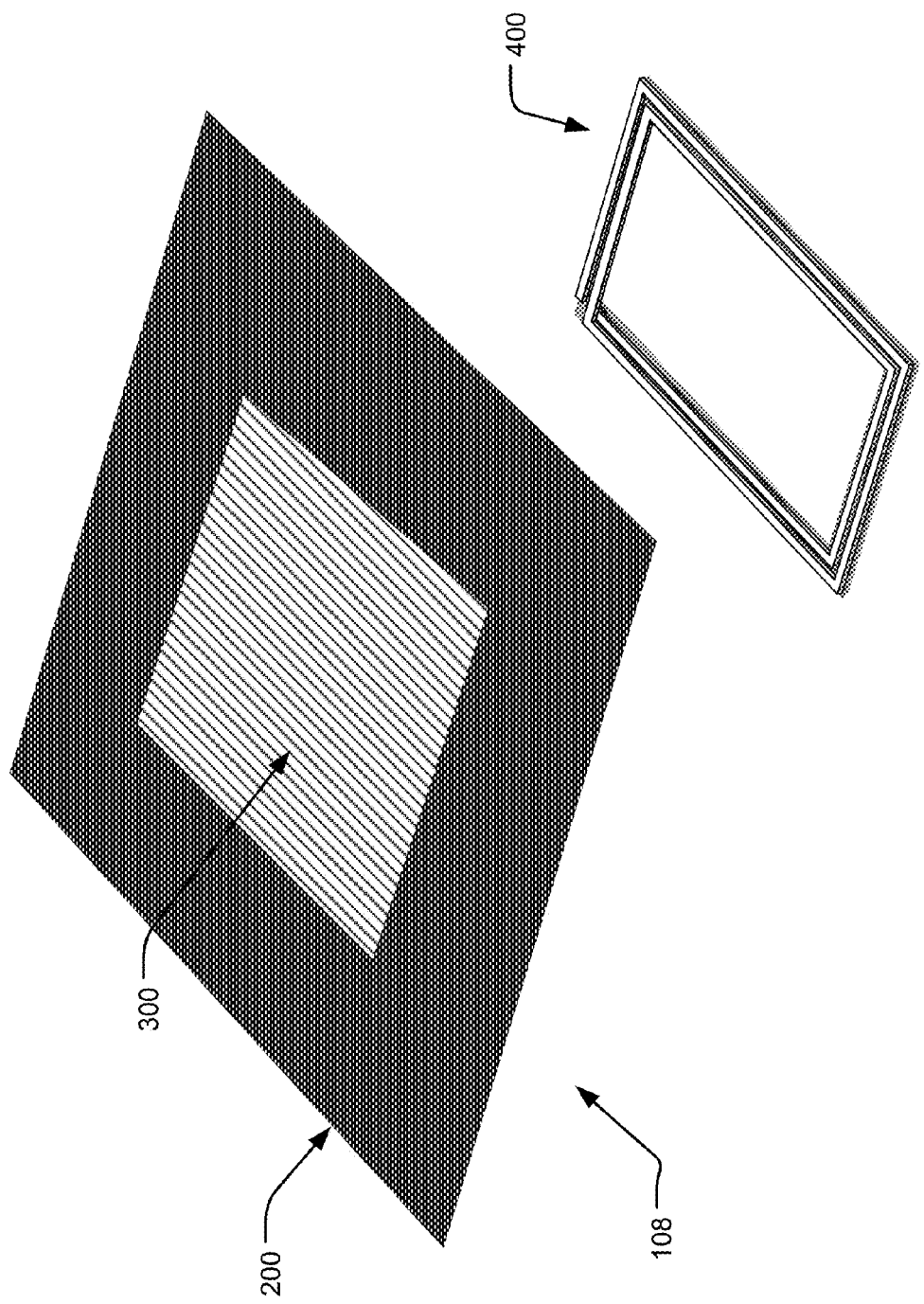
FIG. 4A illustrates an example top view of a dismantled portion of a carbon fiber chassis of a portable device.

FIG. 4A illustrates an example top view of a dismantled portion of the carbon fiber chassis 108 of the portable device 102. FIG. 4A shows the dismantled portion of the carbon fiber chassis 108 to contain the CFRP 200 that surrounds the CFRP 300. Furthermore, a coil antenna 400 is shown underneath the carbon fiber chassis 108, and more specifically, underneath the CFRP 300.

As an example, the CFRP 300 may contain an area that is at least equal to the area of the coil antenna 400. For example, the CFRP 300 may at least cover the area that is defined by an outermost loop of the coil antenna 400. In this example, the magnetic fields (not shown) may easily pass through the CFRP 300 or come out from the CFRP 300 during receiving mode or transmitting mode, respectively.

As an example, the direction of the carbon fibers in the CFRP 300 is configured to be unidirectional and in parallel with a length of the coil antenna 400. In other words, for a rectangular coil antenna 400, the direction of the carbon fibers in the CFRP 300 will be parallel to the length of the rectangular coil antenna 400.

Furthermore, for example the outskirts of the CFRP 300 may be connected to the CFRP 200 in order to provide strength of materials to the CFRP 300. The fiber carbon chassis 108 may contain layers of the CFRP 200 except within the area that is covered by the coil antenna 400. A single CFRP 300 in the carbon fiber chassis 108 may be utilized to implement the NFC communication by the coil antenna 400.

With continuing reference to FIG. 4A, the coil antenna 400 may include a flat coil antenna in its design, so that (in part) the portable device 102 may possess desirable thin aspect ratios and small form factors. The coil antenna 400 may include a continuous loop of coil antenna that is mounted on, embedded in, or otherwise associated with a ferrite material (not shown). The coil antenna 400 may include a dedicated antenna for NFC and/or WPT purposes. In other words, the coil antenna 400 may be configured to operate on a separate resonant frequency (e.g., 13.56 MHz to implement NFC and/or WPT operations), and independent from another antenna that uses another frequency for wireless communications (e.g., 5 GHz for Wi-Fi signals). The coil antenna 400 may be made out of a printed circuit board (PCB), flexible printed circuit (FPC), a metal wire, created through a laser direct structuring (LDS) process, or directly printed onto the ferrite material.

Figure 4B:
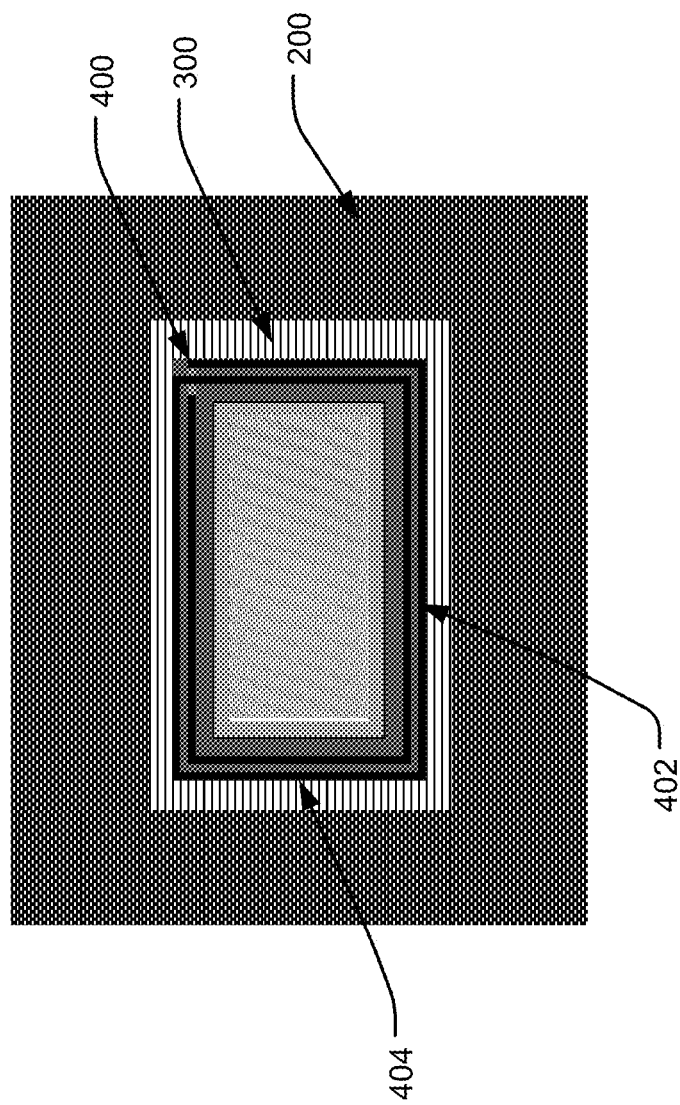
FIG. 4B illustrates an example upside down view of a coil antenna that lay over a portion of a carbon fiber chassis portable device.

FIG. 4B illustrates an example upside down view of the coil antenna 400 that lay over a portion of the carbon fiber chassis 108 of the portable device 102. FIG. 4B further shows a length 402 and a width 404 of the coil antenna 400.

As an example of present implementation herein, the CFRP 300 is configured to be on top next to the coil antenna 400 to perform the NFC related functions. In this example, the CFRP 300 covers an area that is at least equal to the area that is defined by multiplying the length 402 by the width 404 of the coil antenna 400. Furthermore, the direction of the bundle of carbon fiber strands in the CFRP 300 adapts the direction of the length 402 of the coil antenna 400.

In another implementation, the CFRP 300 that covers the width 404 of the coil antenna 400 may be configured to adapt a different direction. In other words, the CFRP 300 that covers the width 404 may contain bundle of carbon fiber strands that are perpendicular to the CFRP 300 that covers the length 402 of the coil antenna 400. This configuration of the CFRP 300 at the width 404 may further prevent generation of the Eddy current. This is due to higher impedance that is provided by the direction of the CFRP 300 over the width 404 of the coil antenna 400.

Figure 5:
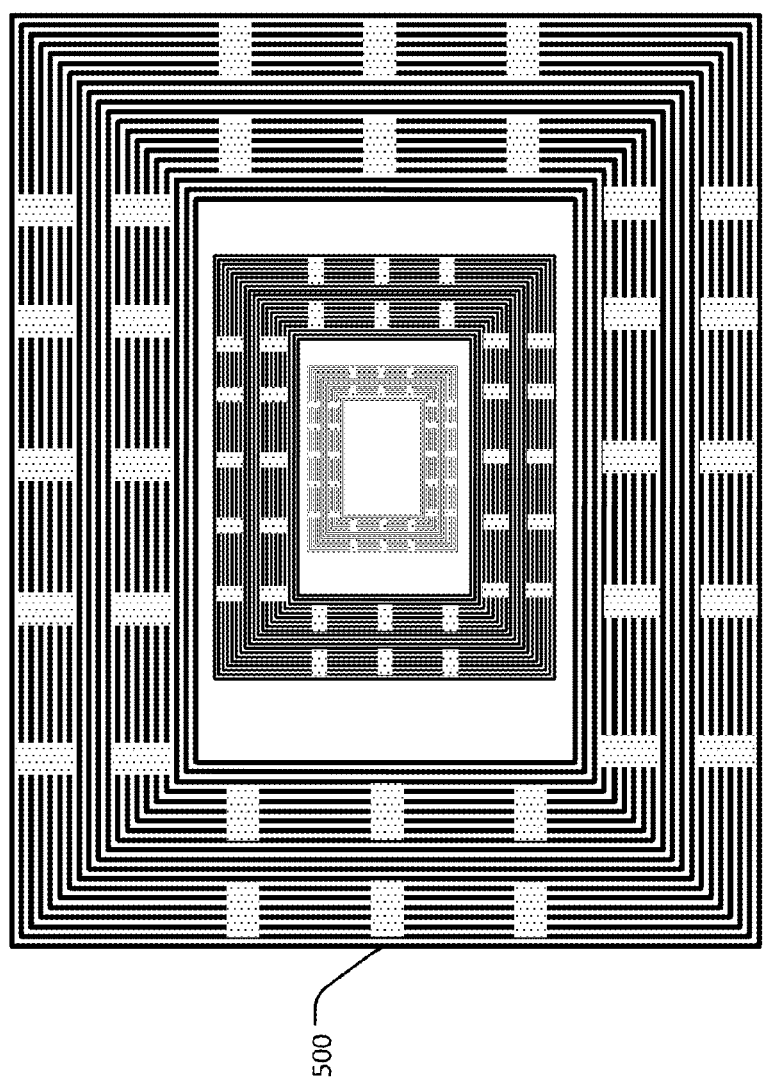
FIG. 5 illustrates an example carbon fiber reinforced polymer (CFRP) that is utilized as a coil antenna.

FIG. 5 illustrates an example CFRP 500 that is utilized as a coil antenna. In an implementation, the CFRP 500 is configured to include a continuous loop of carbon fibers to form an elliptical or rectangular CFRP 500.

The CFRP 500 is a portion of the carbon fiber chassis 108; however, the CFRP 500 is configured to be a separate and independent carbon fiber from the rest of the carbon fiber chassis 108. In other words, the CFRP 500 may directly transmit or receive signals during the NFC communications. In an implementation, the CFRP 500 is grounded to suppress electrostatic discharge (ESD).

Figure 6:
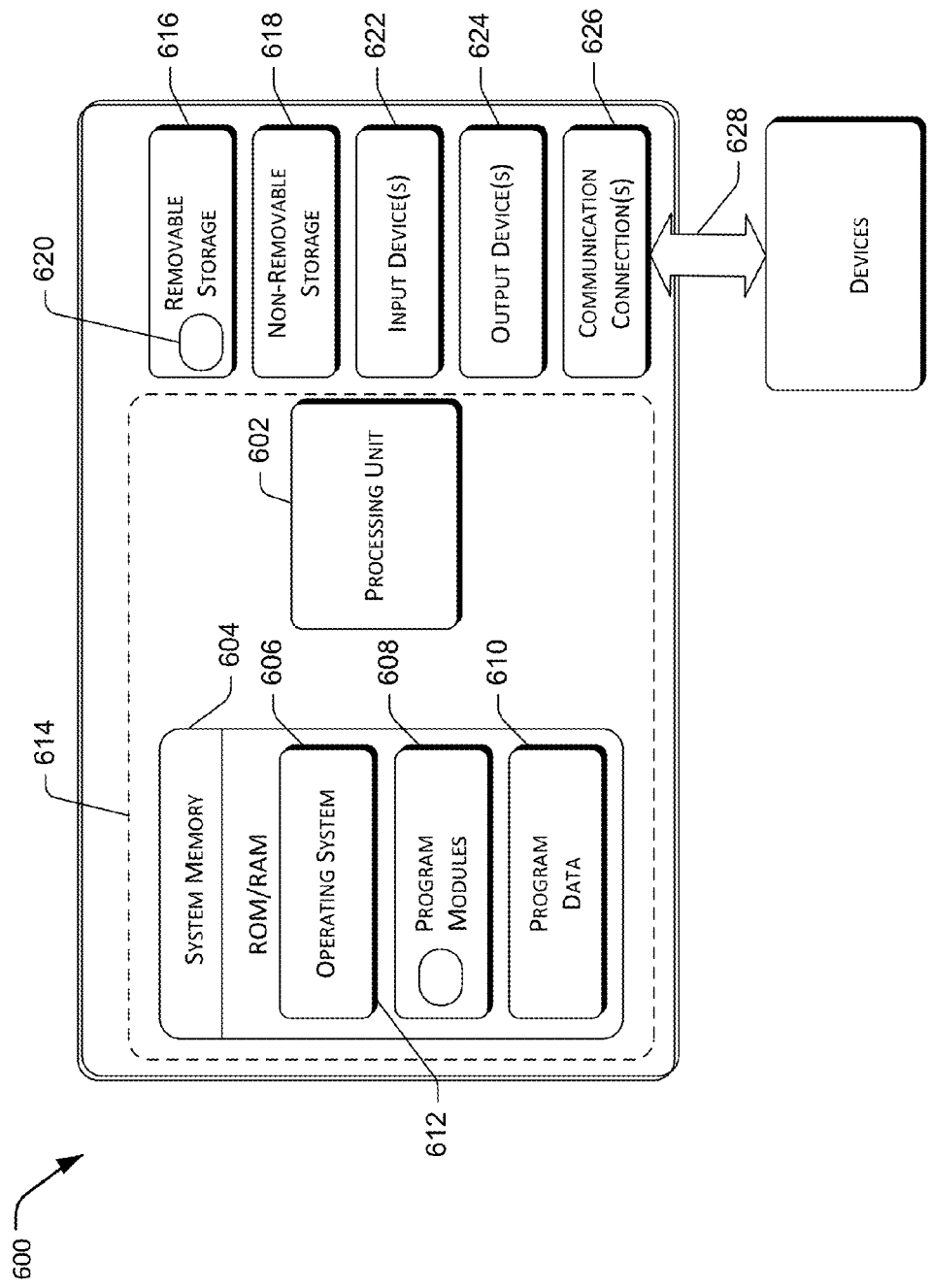
FIG. 6 is an example system that may be utilized to implement various described embodiments.

FIG. 6 is an example system that may be utilized to implement various described embodiments. However, it will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608 that implement the long delay echo algorithm, and may include program data 610. A basic implementation of the computing device 600 is demarcated by a dashed line 614.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device. Any of such computer accessible media may be part of the computing device 600.

In one implementation, the removable storage 616, which is a computer accessible medium, has a set of instructions 630 stored thereon. When executed by the processing unit 602, the set of instructions 630 cause the processing unit 602 to execute operations, tasks, functions and/or methods as described above, including method 600 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate wirelessly with one or more other wireless devices, over wireless connection 628 based on near field communication (NFC), Wi-Fi, Bluetooth, radio frequency (RF), infrared, or a combination thereof.

It is appreciated that the illustrated computing device 600 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

Example Process

Figure 7:
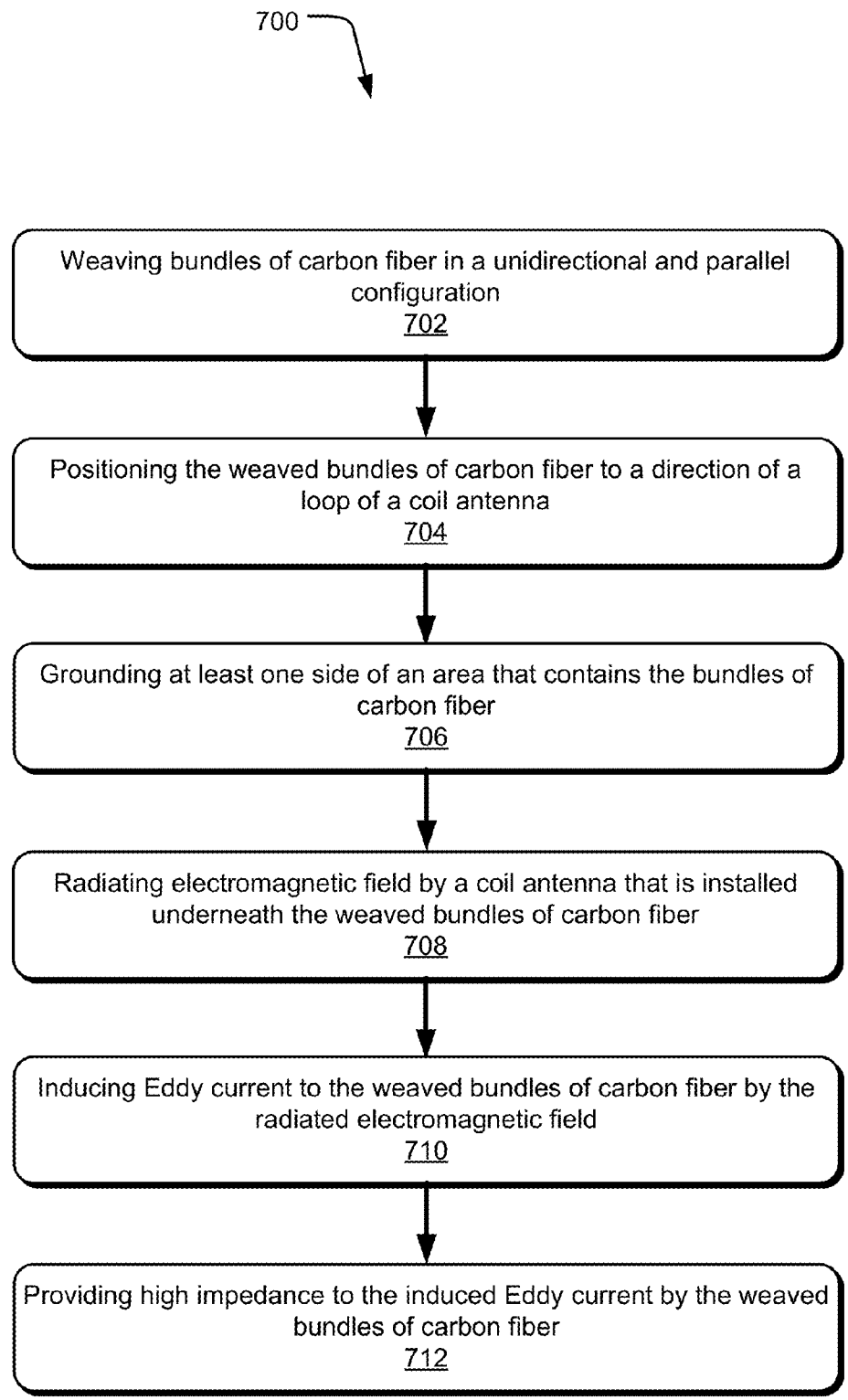
FIG. 7 shows an example process flowchart illustrating an example method for integrating a near field communications (NFC) antenna in a carbon fiber chassis portable device.

FIG. 7 shows an example process chart 700 illustrating an example method for integrating a NFC antenna in a carbon fiber chassis portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, weaving bundles of carbon fiber in a unidirectional and parallel configuration is performed. In an implementation, the bundles of carbon fiber (e.g., vertical carbon fibers 202) are weaved to form the unidirectional and parallel configuration. In this implementation, the vertical carbon fibers 202 are interlaced with a non-conductive lacing material in order to create a unidirectional weave CFRP configuration (e.g., CFRP 300)

At block 704, positioning the weaved bundles of carbon fiber to direction of a loop of a coil antenna is performed. For example, in a rectangular coil antenna (e.g., coil antenna 400), the CFRP 300 may be configured to adapt the direction of a length (e.g., length 402) and a width (e.g., width 404) of the coil antenna 400. In this example, the CFRP 300 is perpendicular to assumed direction of Eddy current in order to provide high impedance to the Eddy current. The assumed direction of the Eddy current (e.g., Eddy current 208) may include an opposite direction to the direction of injected current (e.g., injected current 206) in the coil antenna 400.

At block 706, grounding at least one side of an area that contains the bundles of carbon fiber is performed. In an implementation, at least one side of the CFRP 300 may be grounded to provide ESD protection to the coil antenna 400.

At block 708, radiating electromagnetic fields by the coil antenna is performed. In an implementation, the injected current 206 in the coil antenna 400 may provide radiation of the electromagnetic fields during NFC related operations.

At block 710, inducing the Eddy current is performed. In an implementation, the radiated electromagnetic field may induce the Eddy current 208 to the CFRP 300.

At block 712, providing high impedance to the induced Eddy current is performed. In an implementation, the unidirectional configuration and the positioning of the CFRP 300 may provide the high impedance to the Eddy current 208. The high impedance may be generated by the perpendicular configuration of the CFRP 300 to the assumed direction of the Eddy current 208.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device comprising:
   one or more processors;
   a memory configured to the processors;
   a near field communications (NFC) antenna configured to the processors, the NFC antenna integrated within a carbon fiber reinforced polymer (CFRP) chassis of the portable device, the CFRP chassis includes bundles of carbon fiber strands that are positioned to form a unidirectional weave.

2. The device as recited in claim 1, wherein a plane area of the unidirectional weave in the CFRP chassis covers at least the plane area that is defined by an outermost loop of the coil antenna.

3. The device as recited in claim 1, wherein the bundles of carbon fiber strands with the unidirectional weave are interlaced with a non-conductive material.

4. The device as recited in claim 1, wherein the CFRP chassis includes an additional layer of twill weaved carbon fiber strands, the additional layer of twill weaved carbon fiber strands covers a plane area outside of the plane area that is defined by an outermost loop of the coil antenna.

5. The device as recited in claim 1, wherein the NFC antenna includes a continuous loop of coil antenna, a direction of the loop of the coil antenna follows the direction of the formed unidirectional weave.

6. The device as recited in claim 1, wherein a direction of the formed unidirectional weave in the CFRP chassis is configured to be perpendicular to an assumed direction of Eddy currents that are induced by the NFC antenna to the CFRP chassis.

7. The device as recited in claim 1, wherein the CFRP chassis is grounded to suppress electrostatic discharge (ESD).

8. The portable device as recited in claim 1, wherein the coil antenna is made out of one of: a printed circuit board (PCB), a flexible printed circuit (FPC), a metal wire, created through a laser direct structuring (LDS) process, or directly embedded to the metal chassis and within the conductive coating.

9. A near field communications (NFC) antenna comprising:
   a continuous loop of coil antenna that is integrated within a carbon fiber reinforced polymer (CFRP) chassis of a portable device, the CFRP chassis includes carbon fiber strands in a single direction to cover the coil antenna; and
   an NFC module to provide tuning to the coil antenna.

10. The NFC antenna as recited in claim 9, wherein a plane area of the carbon fiber strands covers at least the plane area that is defined by the coil antenna.

11. The NFC antenna as recited in claim 9, wherein the carbon fiber strands in the single direction are interlaced with a non-conductive material.

12. The NFC antenna as recited in claim 9, wherein the CFRP chassis includes an additional layer of twill weaved carbon fiber strands, the additional layer of twill weaved carbon fiber strands covers a plane area that is outside of the plane area defined by the coil antenna.

13. The NFC antenna as recited in claim 9, wherein a direction of the loop of the coil antenna is parallel to the direction of the carbon fiber strands that are unidirectional in weave.

14. The NFC antenna as recited in claim 9, wherein the single direction of the CFRP chassis is configured to be perpendicular to an assumed direction of Eddy currents that are induced by the coil antenna to the CFRP chassis.

15. The NFC antenna as recited in claim 9, wherein the coil antenna is made out of one of a printed circuit board (PCB), a flexible printed circuit (FPC), a metal wire, created through a laser direct structuring (LDS) process, or directly embedded to the metal chassis and within the conductive coating.

16. A method of integrating a near field communications (NFC) antenna to a carbon fiber reinforced polymer (CFRP) chassis portable device, the method comprising:
   weaving bundles of carbon fiber in a unidirectional and parallel configuration, wherein the bundles of carbon fiber are interlaced with non-conductive materials;
   positioning the weaved bundles of carbon fiber to a direction of a loop of the NFC antenna;
   radiating electromagnetic fields by the NFC antenna;
   inducing a current to the weaved bundles of carbon fiber by the radiated electromagnetic fields; and
   providing high impedance to the induced current.

17. The method as recited in claim 16, wherein the CFRP chassis portable device includes an additional layer of twill weaved carbon fiber, the additional layer of twill weaved carbon fiber covers a plane area that is outside of the plane area defined by the NFC antenna.

18. The method as recited in claim 16, wherein the bundles of carbon fiber in the unidirectional and parallel configuration cover at least a plane area that is defined by the NFC antenna.

19. The method as recited in claim 16, wherein the unidirectional and parallel configuration is perpendicular to an assumed direction of Eddy currents that are induced by the NFC antenna to the CFRP chassis portable device.

20. The method as recited in claim 16, wherein the coil antenna is made out of one of a printed circuit board (PCB), a flexible printed circuit (FPC), a metal wire, created through a laser direct structuring (LDS) process, or directly embedded to the metal chassis and underneath the conductive coating.

* * * * *